Patented Feb. 23, 1943

2,312,193

UNITED STATES PATENT OFFICE 2,312,193

PROCESS FOR PREPARING ALKYLIDENE DERIVATIVES OF ALPHA - METHYLENE MONOCARBOXYLIC ACIDS

Henry John Richter, Wilmington, Del., assignor to E. I. du Pont de Nemours & Company, Wilmington, Del., a corporation of Delaware No Drawing. Application March 14, 1939, Serial No. 261,767

6 Claims. (Cl. 260—83)

This invention relates to synthetic resins, and more particularly to vinyl type polymers, and still more particularly to monomers and polymers of alkylidene esters of alpha-methylene monocarboxylic acids and to interpolymers of these esters with other polymerizable materials.

This invention has for an object the production of alkylidene esters of alpha-methylene monocarboxylic acids and methods for preparing the same. A further object is the preparation of new and useful resins by polymerization of said alkylidene esters of alpha-methylene monocarboxylic acids. A still further object is to provide artificial resins of varying hardness and water permeability by interpolymerization of negatively substituted vinylidene compounds with these new esters.

These objects have been accomplished by reacting aldehydes with anhydrides of alpha-methylene monocarboxylic acids in the presence of a catalyst; by polymerizing the resulting esters, and by interpolymerizing said esters with completely organic negatively substituted vinylidene compounds. The nature of the reaction for forming the esters may be indicated by the following equation:

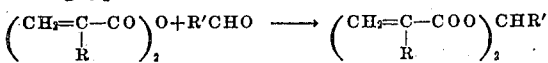

In this equation, R is a radical selected from the group consisting of hydrogen, alkyl, aryl, and halogen, and R' is a radical selected from the group consisting of hydrogen, alkyl, aryl, aralkyl, and alkenyl. This reaction is carried out in the presence of a condensation catalyst, such, for example, as sulfuric acid or ferric chloride. The esters thus formed readily polymerize to yield high-melting, water-insoluble polymers. They interpolymerize very readily with negatively substituted vinylidene compounds to give interpolymers having desirable characteristics.

In order that the invention may be more fully understood, the following specific examples are given. Such examples are merely by way of illustration. The invention is not limited thereto, but suitable variations may be made as will become more apparent hereinafter.

EXAMPLE I

*Preparation of ethylidene dimethacrylate from acetaldehyde and methacrylic anhydride*

Anhydrous ferric chloride (0.5 g.) was dissolved in 46 g. of cold methacrylic anhydride in a reaction vessel. Acetaldehyde (13.2 g.) was added in portions with stirring and cooling at such a rate that the temperature did not exceed 18° C. after each addition. The mixture was cooled to 5° C. before the next portion was added. After completion of the addition, the vessel was closed, placed in an ice bath, and eventually allowed to come slowly to room temperature. After standing a total of about six hours, the product was diluted with ether and washed first with cold water and then with cold dilute aqueous sodium bicarbonate solution. Hydroquinone was added, the mixture dried over anhydrous magnesium sulfate, and then fractionated under reduced pressure, collecting the fraction boiling at 82–85° C./5 mm. This distilled product contained some hydroquinone which was removed by washing with cold dilute sodium hydroxide prior to polymerization. By this method, a 67 per cent yield of ethylidene dimethacrylate was obtained.

EXAMPLE II

*Preparation of methylene dimethacrylate from paraformaldehyde and methacrylic anhydride*

Ten drops of concentrated sulfuric acid were slowly added to a mixture composed of 5 g. paraformaldehyde, 31 g. methacrylic anhydride and 1 g. cuprous chloride in a reaction vessel. This mixture was then heated in an oil bath at 100° C. for 20 minutes and then for about 5 minutes at 130° C. After cooling and diluting with ether, the mixture was washed well with cold dilute aqueous sodium carbonate solution followed by washing with water, and then was dried over anhydrous magnesium sulfate. Hydroquinone was added, the ether removed, and the residue distilled under reduced pressure collecting the fraction boiling at 93–95° C./9–10 mm. The yield was 25 g. The distilled product washed with cold dilute sodium hydroxide solution prior to polymerization.

EXAMPLE III

*Preparation of heptylidene dimethacrylate*

Heptylaldehyde (23 g.) was slowly added to a cold (5° C.) mixture of 31 g. methacrylic anhydride and 0.2 g. anhydrous ferric chloride in a reaction vessel. After completion of the addition, the mixture was allowed to stand at room temperature for 5 hours and then diluted with ether and washed first with cold water and then with a cold dilute aqueous solution of sodium carbonate. After drying over anhydrous magnesium sulfate, hydroquinone was added, the ether was removed, and the residue was distilled under reduced pressure to yield a product boiling at 125–130° C. at 4 mm. The distilled heptylidene dimethacrylate was washed with dilute sodium hydroxide solution to remove any hydroquinone and then polymerized by heating for two days at 60° C. The polymer was clear, hard, and brittle.

EXAMPLE IV

*Preparation of acrylidene dimethacrylate*

Acrolein (12 g.) was slowly added to a mixture of 31 g. methacrylic anhydride and 0.2 g. anhydrous ferric chloride in a reaction vessel cooled in an ice bath. The reaction mixture was kept cold (5°–10° C.) during the addition of the acrolein and then allowed to come slowly to room temperature. After standing at room temperature for four hours, the reaction mixture was diluted with ether and washed with water, then with dilute aqueous sodium carbonate solution, and then dried over anhydrous magnesium sulfate. Hydroquinone was added, and after removal of the ether, the residue remaining was subjected to distillation under reduced pressure. The product boiling at 85–92° C. at 2–3 mm. polymerized very readily, after removal of the hydroquinone, to give a clear, hard, and brittle polymer.

EXAMPLE V

*Polymerization of ethylidene dimethacrylate*

A 10 g. sample of ethylidene dimethacrylate polymerized at 60° C. without a catalyst in forty-eight hours to a clear, hard, insoluble, somewhat brittle polymer. Methylene, propylidene, butylidene, acrylidene, and heptylidene dimethacrylates polymerized readily under similar conditions.

EXAMPLE VI

*Interpolymerization of ethylidene dimethacrylate and methyl methacrylate*

A mixture comprising 90 grams of monomeric methyl methacrylate and 10 grams of ethylidene dimethacrylate was allowed to remain at 60° C. for 1½ days after which time it had polymerized to a clear, insoluble, and water-resistant polymer which softened at 143° C. as compared with an unmodified methyl methacrylate polymer which softened at 122° C.

EXAMPLE VII

*Interpolymerization of vinyl acetate and ethylidene dimethacrylate*

A mixture comprising 22.5 g. monomeric vinyl acetate, 2.5 g. ethylidene dimethacrylate, and 0.2 g. benzoyl peroxide was allowed to remain at 60° C. for two hours during which period it polymerized to give a spongy polymer which, when molded at 50–100° C. and 1000–3000 pounds pressure, gave a product which was clear, tough, and flexible.

EXAMPLE VIII

*Interpolymerization of methyl methacrylate and methylene dimethacrylate*

Forty-seven and five-tenths grams of monomeric methyl methacrylate and 2.5 g. of methylene dimethacrylate were interpolymerized by heating for sixteen hours at 60° C. A clear insoluble casting, formed from the interpolymer, softened at 120° C. and was not affected by boiling water.

EXAMPLE IX

*Interpolymerization of methyl acrylate and ethylidene dimethacrylate*

A mixture of 11.25 g. of methyl acrylate, 1.25 g. of ethylidene dimethacrylate, and 0.1 g. of benzoyl peroxide was polymerized by heating for eight hour at 60° C. The resulting interploymer was clear, tough, and insoluble in toluene.

EXAMPLE X

*Interpolymerization of methyl methacrylate and butylidene dimethacrylate*

A mixture comprising 11.25 g. of methyl methacrylate and 1.25 g. of butylidene dimethacrylate was ploymerized by heating for one day at 60° C. The resulting interpolymer was clear, hard, and insoluble and softened at 120° C.

In its broadest conception, this invention involves monomers, polymers, and interpolymers of alkylidene esters of alpha-methylene monocarboxylic acids. The monomers are made by condensation of aldehydes with acid anhydrides. The aldehydes may contain alkyl, aryl, aralkyl, or alkenyl groups, such, for example, as acetaldehyde, butyraldehyde, valeric aldehyde, heptaldehyde, benzaldehyde, o-toluyl aldehyde, phenylacetaldehyde, cinnamic aldehyde, acrolein, croton aldehyde, and the like. The preferred aldehydes are formaldehyde and those containing saturated alkyl radicals, and especially preferred are acetaldehyde and formaldehyde (or paraformaldehyde).

The acid anhydrides with which this invention is concerned are anhydrides of monocarboxylic acids having an alpha-methylene group. The anhydride may be derived from an acid containing alkyl, aryl, or halogen groups, such, for example, as α-methacrylic acid anhydride, α-butyl acrylic acid anhydride, α-phenyl acrylic acid anhydride, α-chloro-acrylic acid anhydride and the like. The preferred acid anhydrides are acrylic acid anhydride and methacrylic acid anhydride, the latter being especially preferred.

The condensation is carried out in the presence of a condensation catalyst. By way of example may be mentioned ferric chloride, zinc chloride, aluminum chloride, sulfuric acid, phosphoric acid, aromatic sulfonic acids, aliphatic sulfonic acids, and the like. The preferred catalysts are ferric chloride and concentrated sulfuric acid. It was found that, in reacting para-formaldehyde with methacrylic anhydride in the presence of concentrated sulfuric acid, the addition of a small amount of cuprous chloride favorably influenced the size of yield, presumably due to an inhibiting action on the polymerization of the reacting materials. Accordingly, it is preferred that cuprous chloride or other suitable polymerization inhibitors be included in the reaction mixture when concentrated sulfuric acid is used as a catalyst. Cuprous chloride or other suitable polymerization inhibitors may also be used in conjunction with the other condensation catalysts. This is of particular advantage if the reaction is to be carried out at relatively high temperatures.

The esters formed as above described readily polymerize to clear, hard, water-insoluble, somewhat brittle polymers. This polymerization may be carried out in the presence or absence of polymerization catalysts by heating the monomers at any temperature up to the decomposition point of the monomers or polymers and the polymerization may be effected at atmospheric, superatmospheric or subatmospheric pressures. Solvents may be used if desired, or the polymerization may also be carried out in aqueous emulsion in the presence of a suitable catalyst and emulsifying agent. Unmodified polymerized alkylidene dimethacrylates may be used wherever high temperature-softening and quite heat-stable resins are desired. It is possible to modify the properties of other polymeric materials desirably by interpolymerization of their monomers with the new unsaturated alkylidene derivatives. For example, the softening temperature of polymeric vinyl compounds can be raised and their rate of polymerization accelerated by interpolymerization with these agents.

The alkylidene esters of alpha-methylene monocarboxylic acids may be used in combination with other polymerizable materials in the preparation of cast articles and molding powders. In the preparation of cast articles by bulk polymerization of an alkylidene dimethacrylate with another polymerizable substance, the amount of alkylidene dimethacrylate may be varied widely depending on the results desired. The softening temperature of the interpolymer of methyl methacrylate and ethylidene dimethacrylate or methylene dimethacrylate increases as the amount of the ethylidene dimethacrylate is increased.

In general, it has been found advantageous to interpolymerize the polymerizable materials of the present invention with a polymerizable organic compound containing a methylene ($CH_2$) group attached by an ethylenic double bond to a carbon atom, which is in turn attached to at least one negative group. "Negative group," as here used, means an organic radical containing a carbon atom joined to a second atom by more than one bond, the multi-bonded carbon atom being separated from the above-mentioned ethylenic double-bonded carbon atom by not more than one atom. Among such vinyl and vinylidene compounds may be mentioned esters of methacrylate acids such as methyl, ethyl, and butyl methacrylates, esters of acrylic acids such as methyl, propyl, and octyl acrylate, methacrylic nitrile, vinyl acetate, methyl vinyl ketone, butadiene, chloroprene, and styrene. All of these compounds fall within that class of polymerizable unsaturated organic compounds represented by the formula

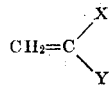

where X is hydrogen or alkll and Y is an unsaturated radical selected from the group consisting of

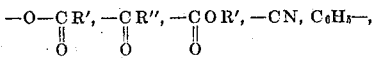

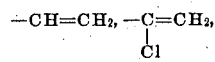

where R' is hydrogen or alkyl and R'' is alkyl.

These new unsaturated acid derivatives often increase the rate of polymerization of other polymerizable materials when they are interpolymerized with said other polymerizable materials. In a number of these cases, notably in the interpolymerization of methyl methacrylate and ethylidene dimethacrylate, products are obtained which soften at higher temperatures than the unmodified polymeric methyl methacrylate. These products in general are not affected by boiling water.

The polymeric alkylidene derivatives of alpha-methylene monocarboxylic acid and the interpolymers formed by interpolymerizing these compounds with other polymerizable materials, either alone or in the presence of plasticizers, fillers, pigments, synthetic and natural waxes, are useful in the preparation of cast articles. Molded articles such as buttons, combs, containers, tubes, and the like can be prepared from the interpolymers described above. These polymers and interpolymers, either alone or in the presence of other resinous bodies, waxes, pigments, dyes, plasticizers, can be used in lacquers, paints, varnishes, and enamels for the coating of glass, metal, wood, and similar materials. They are also useful for coating and the impregnation of cloth, textiles, leather, and paper, and may be used in the preparation of reinforced collars, cuffs, and similar articles of clothing. The interpolymers are also useful in the making of optical elements such as lenses, prisms, etc.

Suitable changes may be made in the details of the process and any modifications or variations, which conform to the spirit of the invention are intended to be included within the scope of the claims.

I claim:

1. Process of preparing alkylidene derivatives of alpha-methylene monocarboxylic acids which comprises reacting an aldehyde with an anhydride of an alpha methylene monocarboxylic acid in the presence of an acid-reacting condensation catalyst.

2. Process of preparing alkylidene derivatives of alpha-methylene monocarboxylic acids which comprises reacting an aldehyde with an anhydride of an alpha methylene monocarboxylic acid in the presence of sulfuric acid.

3. Process of preparing ethylidene dimethacrylate which comprises reacting methacrylic anhydride with acetaldehyde in the presence of anhydrous ferric chloride.

4. Process of preparing methylene dimethacrylate which comprises reacting methacrylic anhydride with paraformaldehyde in the presence of concentrated sulfuric acid and cuprous chloride.

5. Resinous polymeric methylene dimethacrylate.

6. Process of making a resin which comprises reacting methacrylic anhydride with paraformaldehyde in the presence of concentrated sulfuric acid and cuprous chloride, isolating the resulting methylene dimethacrylate and polymerizing the methylene dimethacrylate.

HENRY JOHN RICHTER.